(12) United States Patent
Glaentz et al.

(10) Patent No.: US 11,692,888 B2
(45) Date of Patent: Jul. 4, 2023

(54) BEARING UNIT HAVING AT LEAST TWO KINDS OF SENSING ELEMENTS MOUNTED ON A HOUSING

(71) Applicant: Aktiebolaget SKF, Gothenburg (SE)

(72) Inventors: Wolfgang Glaentz, Schweinfurt (DE); Sebastian Ziegler, Bamberg (DE)

(73) Assignee: Aktiebolaget SKF, Gothenburg (SE)

( * ) Notice: Subject to any disclaimer, the term of this patent is extended or adjusted under 35 U.S.C. 154(b) by 309 days.

(21) Appl. No.: 17/060,211

(22) Filed: Oct. 1, 2020

(65) Prior Publication Data

US 2021/0131894 A1 May 6, 2021

(30) Foreign Application Priority Data

Nov. 5, 2019 (DE) .......................... 102019216992.9

(51) Int. Cl.
*F16C 19/52* (2006.01)
*F16C 19/54* (2006.01)
*G01L 5/00* (2006.01)
*G01L 1/24* (2006.01)
*G01M 13/045* (2019.01)

(52) U.S. Cl.
CPC .......... *G01L 5/0009* (2013.01); *F16C 19/522* (2013.01); *F16C 19/527* (2013.01); *F16C 19/542* (2013.01); *G01L 1/246* (2013.01); *G01M 13/045* (2013.01); *F16C 2233/00* (2013.01)

(58) Field of Classification Search
CPC .... F16C 19/522; F16C 19/527; F16C 19/542; F16C 23/086; F16C 2233/00; G01L 1/246; G01L 5/0009; G01M 13/045
See application file for complete search history.

(56) References Cited

U.S. PATENT DOCUMENTS

| 6,360,616 | B1 * | 3/2002 | Halliday | ............... | G01L 5/0009 |
| | | | | | 73/862.49 |
| 6,546,785 | B1 * | 4/2003 | Discenzo | ............. | G01N 29/022 |
| | | | | | 73/61.41 |
| 6,802,208 | B2 * | 10/2004 | Chinitz | ................. | F16C 19/522 |
| | | | | | 73/115.07 |
| 2003/0115977 | A1 * | 6/2003 | Holweg | .................. | F16C 19/52 |
| | | | | | 702/113 |
| 2009/0114004 | A1 * | 5/2009 | Ozaki | ................. | B60B 27/0005 |
| | | | | | 73/117.01 |
| 2012/0239716 | A1 | 9/2012 | Murray | | |
| 2013/0188897 | A1 | 7/2013 | Reedman | | |
| 2013/0322801 | A1 | 12/2013 | Den Haak | | |
| 2016/0076586 | A1 * | 3/2016 | Campbell | ............. | F16C 19/527 |
| | | | | | 384/448 |

(Continued)

FOREIGN PATENT DOCUMENTS

| DE | 102015208444 A1 | 12/2016 | | |
| EP | 1398636 A2 * | 3/2004 | ............. | B61F 15/20 |
| EP | 2801729 B1 * | 1/2018 | ............. | F16C 19/52 |

(Continued)

*Primary Examiner* — Phillip A Johnson
(74) *Attorney, Agent, or Firm* — Garcia-Zamor Intellectual Property Law, LLC; Ruy Garcia-Zamor

(57) ABSTRACT

Bearing unit providing a housing and at least one bearing mounted in the housing. The bearing unit includes at least one load sensing element and at least one vibration sensing element fixed on the housing.

20 Claims, 1 Drawing Sheet

(56) References Cited

U.S. PATENT DOCUMENTS

2016/0305845 A1   10/2016  Van Der Ham
2020/0161898 A1*   5/2020  Seibert .................. F16C 33/664

FOREIGN PATENT DOCUMENTS

| WO | 2011/066926 A1 | | 6/2011 | | |
|----|----|----|----|----|----|
| WO | WO-2011107107 A1 | * | 9/2011 | ............ | F16C 19/522 |
| WO | WO-2016005550 A1 | * | 1/2016 | ............ | F16C 19/522 |

* cited by examiner

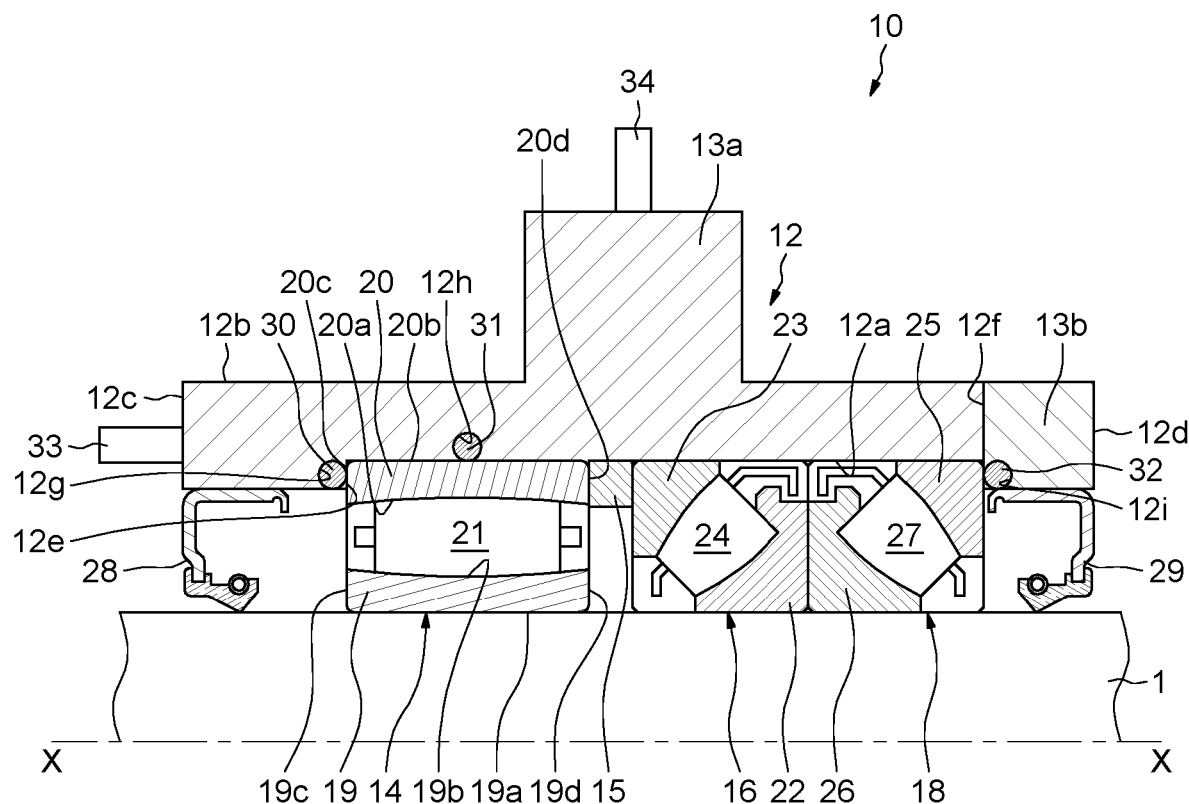

BEARING UNIT HAVING AT LEAST TWO KINDS OF SENSING ELEMENTS MOUNTED ON A HOUSING

CROSS-REFERENCE TO RELATED APPLICATIONS

This application claims priority to German Patent Application no. 102019216992.9, filed Nov. 5, 2019, the contents of which is fully incorporated herein by reference.

TECHNICAL FIELD OF THE INVENTION

The present invention relates to the field of condition monitoring of bearings for control processing by actively sensing loads. More particularly, the invention relates to rolling bearings equipped with a fiber optical sensing element, called FOS, such as an optical fiber.

BACKGROUND OF THE INVENTION

An optical fiber generally comprises a plurality of fiber Bragg gratings, called FBG, for sensing locations evenly spread around the circumference of the ring of the bearing, for example for sensing at least one location additional to the rolling elements.

Fiber optical sensing can be used in monitoring machines, such as for example, pumps, compressors, wind turbines, marine propulsion systems, aeronautic propulsion systems and other rotary machines used for example in applications such as oil and gas, mines, marine, paper making (pulp & paper), aerospace etc. . . . , and any installations where long-distance signals are needed.

Referenced can be made to documents US2016/0305845A1, US 2013/188897A1 and WO 2011/066926 which describe an example of a bearing having circumferential grooves provided on an outer surface of the outer ring of the bearing, each of the grooves accommodates a fiber optical sensing element for measuring bearing loads.

However, in such configuration, the fiber optical sensing elements are subjected to damage during transport of the bearing.

In rotary machines, loads of the rotating shaft are mainly supported by the bearings. It is thus crucial to reduce maintenance time and the complexity of the assembly and therefore maximize machine operating hours. Thanks to condition monitoring systems, maintenance planning may be improved.

The replacement operation of bearings, for example used in cruise liners, is often realized in a construction site not optimal for bearing replacement since the rotating parts might be exposed to weather, humidity, contamination and uncontrolled temperature drifts leading to sensor systems with insufficient measurement accuracy. This may result in a risk of miscalibration of the sensor systems.

There is a need to improve the knowledge of bearing conditions, such as loads, in order to improve bearing life prognostics and failure detection.

SUMMARY OF THE INVENTION

The aim of the present invention is consequently to provide a bearing unit easy to assemble, with reduced damage risk of the sensing elements and with improved measurement accuracy.

It is a particular object of the present invention to provide a bearing unit comprising a housing and at least one bearing mounted inside the housing.

The bearing unit comprises at least one load sensing element and at least one vibration sensing element fixed on the housing.

The at least one load sensing element is distinct from the at least one vibration sensing element. In other words, the bearing unit comprises a housing and two different kinds of sensing elements mounted on the housing.

The bearing is configured to support the forces acting from the shaft to the bearing housing component. The bearing can be replaced without damaging the housing.

The housing acts as a load cell, amplifying forces and transferring accelerations to the sensing elements.

The forces and vibration signals are used as input for bearing condition monitoring and life prognostics, thus evaluation of the bearing performance.

Advantageously, at least one load sensing element is mounted in a groove provided on a bore of the housing into which is mounted the bearing.

For example, the bearing is axially mounted between two axially opposite shoulders of the housing, the at least one load sensing element being mounted in a groove provided on at least one of shoulders of the housing.

In an embodiment, the at least one vibration sensing element is mounted on a frontal surface of the housing.

In an embodiment, the at least one vibration sensing element is mounted on an outer circumferential surface of the housing.

For example, the bearing comprises at least two bearings radially mounted in the housing, for example one toroidal roller bearing and one spherical roller thrust bearing.

In an embodiment, the bearing unit comprises at least a first bearing, such as, for example, a toroidal roller bearing, configured to transmit radial loads and two adjacent second and third bearings, such as, for example, spherical roller thrust bearings, configured to transmit axial and radial loads, the first, second and third bearings being axially mounted between two axially opposite shoulders of the housing.

In another embodiment, the bearing unit comprises at least three load sensing elements comprising:

a first load sensing element located in a first groove provided on the first shoulder of the housing in axial contact with the first bearing;

a second load sensing element located in a second groove provided on the bore of the housing in radial contact with the outer ring of the first bearing; and a third load sensing element located in a third groove provided on a second shoulder of the housing, axially opposite to the first shoulder, the third fiber optical sensing element being in axial contact with the third bearing.

In an embodiment, the bearing unit comprises at least two vibration sensing elements comprising:

a first vibration sensing element mounted on a first frontal surface of the housing; and a second vibration sensing element mounted on the outer cylindrical surface of the housing.

The number of load sensing elements is not limited to three. Indeed, the bearing unit may comprise two, or more than three load sensing elements.

The number of vibration sensing elements is not limited to two. Indeed, the bearing unit may comprise more than two vibration sensing elements.

For example, the load sensing element is a fiber optical sensing element.

The optical fiber may comprise a plurality of fiber Bragg gratings, called FBG, for sensing locations evenly spread around the circumference of the first ring of the bearing. For example, the fiber Bragg gratings are used to measure local strain in the circumferential groove.

For example, the vibration sensing element is a piezoelectric sensing element.

The housing is made in one part or may comprises a plurality of axially stacked housing components.

BRIEF DESCRIPTION OF THE FIGURES

The present invention and its advantages will be better understood by studying the detailed description of specific embodiment given by way of non-limiting example and illustrated by the appended drawing on which:

FIG. 1 illustrates a partial cross-section view of a bearing unit according to an embodiment of the invention.

DETAILED DESCRIPTION OF THE INVENTION

The expressions "outer" and "inner" refer to the rotation axis X-X of the bearing, the inner parts being closer to the rotation axis than the outer parts.

Referring to FIG. 1, which illustrates an embodiment of a bearing unit 10 comprising a housing 12 and three bearings 14, 16, 18 radially mounted inside the housing 12 and designed to be mounted around a shaft 1.

As an alternative, the bearing unit 10 may comprise a single bearing, or two bearings of a number of bearings higher than three.

As illustrated, the housing 12 is radially delimited by an inner cylindrical surface 12a and an outer cylindrical surface 12b. The housing 12 further comprises two radial frontal surfaces 12c, 12d which axially delimits the inner cylindrical surface 12a and the outer cylindrical surface 12b. As shown, the housing 12 comprises a first part 13a and a second 13b stacked relative to the first part 13a in the axial direction.

The bearings 14, 16, 18 are mounted radially on the inner surface or inside the bore 12a of the housing 12, notably the first part 13a and axially between two axially opposite shoulders 12e, 12f of the housing 12. The first shoulder 12e is provided in the first part 13a of the housing 12, while the second shoulder 12f is provided in the second part 13b of the housing 12. The second part 13b of the housing 12 maintains axially the bearings 14, 16, 18 inside the first part 13a of the housing 12.

As a way of the non-limiting example, the bearing unit 10 comprises a first bearing 14 such as, for example, a toroidal roller bearing configured to transmit radial loads. The first bearing 14 comprises an inner ring 19, an outer ring 20 and one row of rolling elements 21, such as for example rollers, arranged between the inner and outer rings 19, 20. For example, the first bearing 14 comprises a cage (not show) configured to maintain the circumferential spacing of the rolling elements.

The outer ring 19 and the inner ring 20 of the first bearing 14 are in the form of concentric rings rotatable around the rotation axis X-X of the bearing unit 10, the outer ring 20 surrounding radially the inner ring 19.

As illustrated, the outer ring 20 of the first bearing 14 is of solid type and is radially delimited by an inner cylindrical surface 20a having a raceway for the rolling elements 21, and an outer cylindrical surface 20b in radial contact with the inner surface 12a of the housing 12. The outer ring 20 further comprises two opposite radial frontal surfaces 20c, 20d which axially delimits the inner cylindrical surface 20a and the outer cylindrical surface 20b. The first frontal surface 20c is in axial contact with the first shoulder 12e of the housing and the second frontal surface 20d is in axial contact with a shim 15 located axially between the first and second bearings 14, 16. The shim 15 is mounted in the bore 12a of the housing, into which is mounted the bearings 14, 16, 18. Alternatively, the second frontal surface 20d of the outer ring 20 may directly contact the second bearing 16.

As illustrated, the inner ring 19 of the first bearing 14 is of solid type and is radially delimited by an inner cylindrical surface 19a in radial contact with the shaft 1, and an outer cylindrical surface 19b having a raceway for the rolling elements 21. The inner ring 19 further comprises two opposite radial frontal surfaces 19c, 19d which axially delimits the inner cylindrical surface 19a and the outer cylindrical surface 19b.

The bearing unit 10 comprises two adjacent second and third bearings 16, 18 such as, for example, spherical roller thrust bearings, configured to transmit axial and radial loads. Each second and third bearings 16, 18 comprises an inner ring 22, 26, an outer ring 23, 25 and one row of rolling elements 24, 27, such as for example rollers, arranged between the inner and outer rings 22, 23; 26, 25. For example, each second and third bearing 16, 18 comprises a cage (not referenced configured to maintain the circumferential spacing of the rolling elements.

The bearing unit 10 further comprises two opposite sealing elements 28, 29, each mounted in the bore (not referenced) of the corresponding shoulder 12e, 12f of the housing 12 and extending radially inwardly towards the shaft 1. The sealing elements limit the infiltration of liquids, particles and dust from the external environment between the rings of the bearings. The sealing elements are radial shaft seals with garter shaft springs. As an alternative, the sealing elements may be of any other type.

As illustrated, the bearing unit 10 comprises three fiber optical sensing elements 30, 31, 32 configured to measure bearing loads. Loads acting from the rolling elements of the bearings are transferred to the housing. Additional parameters may be measured, such as, for example, pressure, temperature, cage speed or rotation direction.

The number of fiber optical sensing elements is not limited to three. Indeed, the bearing unit may comprise one fiber optical sensing element, or two fiber optical sensing elements or a number higher than three. For example, the bearing unit may comprise a number of fiber optical sensing elements corresponding to the number of outer ring raceways for the rolling elements.

As illustrated, a first fiber optical sensing element 30 is located in a first groove 12g provided on a frontal surface (not referenced) of the shoulder 12e of the housing. The first fiber optical sensing element 30 is in axial contact with the first frontal surface 20c of the outer ring 20 of the first bearing 14.

The bearing unit 10 further comprises a second optical sensing element 31 located in a second groove 12h provided on the inner surface 12a of the housing 12. The second fiber optical sensing element 31 is in radial contact with the outer surface 20b of the outer ring 20 of the first bearing 14.

The bearing unit 10 further comprises a third optical sensing element 32 located in a third groove 12i provided on a frontal surface (not referenced) of the second shoulder 12f of the housing 12. The third fiber optical sensing element 32 is in axial contact with the third bearing 18.

As illustrated, the bearing unit 10 comprises two piezoelectric sensing elements 33, 34 configured to measure vibrations of the bearing. This allows to detect any damage and plan maintenance before any further damage of other components.

The number of piezoelectric sensing elements is not limited to two. Indeed, the bearing unit may comprise one piezoelectric sensing element, or more than two.

As illustrated, a first piezoelectric sensing element 33 is mounted on the first frontal surface 12c of the housing 12 and a second piezoelectric sensing element 34 is mounted on the outer surface 12b of the housing 12.

Loads and vibration signals transmitted respectively by the optical fiber sensing elements and the piezoelectric sensing elements may then be used as input for bearing condition monitoring and bearing life prognostic.

The forces transmitted to the bearings lead to an elastic deformation of the bearing outer rings. If a bearing is damaged, a vibration will be transferred from the damaged outer ring to the housing 12. The housing 12 thus acts as a load cell, absorbing forces and transferring accelerations to the sensing elements.

The housing is designed in a way that the bearings can be mounted and dismounted without damaging the housing.

The bearing unit 10 may be assembled on construction sites under laboratory conditions, before transportation to the assembly site with the shaft. Therefore, the sensing elements are calibrated and preloaded, which increases measurement accuracy and thus the life prognostic of the bearing unit.

Thanks to the invention, it is easy to replace the entire bearing unit including sensing element for time-critical applications, such as for example marine cruise liners. It is also possible to reuse the housing with sensing elements and replace only the bearings when needed.

The invention claimed is:

1. Bearing unit comprising:
a housing comprising a first part and a second part, and
at least one bearing mounted inside the housing, the at least one bearing having an outer ring and an inner ring, the outer ring having a first outer axial end and a second outer axial end, the first outer axial end being opposite the second outer axial end,
at least one load sensing element and at least one vibration sensing element fixed on the housing, wherein
the first part of the housing contacts the first outer axial end of the at least one bearing and the second part of the housing contacts the second outer axial end of the at least one bearing.

2. Bearing unit according to claim 1, wherein the at least one load sensing element is mounted in a groove provided on a bore of the housing into which the bearing is mounted.

3. Bearing unit according to claim 1, wherein the at least one vibration sensing element is mounted on a frontal surface of the housing.

4. Bearing unit according to claim 1, wherein the at least one vibration sensing element is mounted on an outer circumferential surface of the housing.

5. Bearing unit according to claim 1, wherein the load sensing element is a fiber optical sensing element.

6. Bearing unit according to claim 1, wherein vibration sensing element is a piezoelectric sensing element.

7. Bearing unit comprising:
a housing, and
at least one bearing mounted inside the housing,
at least one load sensing element,
and at least one vibration sensing element fixed on the housing, wherein
the bearing is axially mounted between two axially opposite shoulders of the housing, the at least one load sensing element being mounted in a groove provided on at least one of shoulders of the housing.

8. Bearing unit according to claim 7, wherein the at least one load sensing element is mounted in a groove provided on a bore of the housing into which the bearing is mounted.

9. Bearing unit according to claim 7, wherein the at least one vibration sensing element is mounted on a frontal surface of the housing.

10. Bearing unit according to claim 7, wherein the at least one vibration sensing element is mounted on an outer circumferential surface of the housing.

11. Bearing unit according to claim 7, wherein the load sensing element is a fiber optical sensing element.

12. Bearing unit according to claim 7, wherein vibration sensing element is a piezoelectric sensing element.

13. Bearing unit comprising:
a housing,
a first bearing mounted inside the housing and configured to transmit radial loads,
a second bearing mounted inside the housing, axially aligned with the first bearing, and configured to transmit axial and radial loads,
a third bearing mounted inside the housing, adjacent to the second bearing, and configured to transmit axial and radial loads,
at least one load sensing element,
and at least one vibration sensing element fixed on the housing, wherein
the first, second and third bearings are axially mounted between two axially opposite shoulders of the housing.

14. Bearing unit according to claim 13, comprising at least three load sensing elements comprising:
a first load sensing element located in a first groove provided on a first shoulder of the housing in axial contact with the first bearing;
a second load sensing element located in a second groove provided on the bore of the housing in radial contact with the outer ring of the first bearing; and
a third load sensing element located in a third groove provided on a second shoulder of the housing, axially opposite to the first shoulder, the third load sensing element being in axial contact with the third bearing.

15. Bearing unit according to claim 13, comprising at least two vibration sensing elements comprising:
a first vibration sensing element mounted on a first frontal surface of the housing; and
a second vibration sensing element mounted on the outer cylindrical surface of the housing.

16. Bearing unit according to claim 13, wherein the at least one load sensing element is mounted in a groove provided on a bore of the housing into which the bearing is mounted.

17. Bearing unit according to claim 13, wherein the at least one vibration sensing element is mounted on a frontal surface of the housing.

18. Bearing unit according to claim 13, wherein the at least one vibration sensing element is mounted on an outer circumferential surface of the housing.

19. Bearing unit according to claim 13, wherein the load sensing element is a fiber optical sensing element.

20. Bearing unit according to claim 13, wherein vibration sensing element is a piezoelectric sensing element.

* * * * *